(12) United States Patent
Chang

(10) Patent No.: US 7,798,756 B2
(45) Date of Patent: Sep. 21, 2010

(54) SCREW WITH WAVED THREAD

(75) Inventor: Ching-Hsiang Chang, Gueiren Township, Tainan County (TW)

(73) Assignee: Essence Method Refine Co., Ltd., Tainan County (TW)

(*) Notice: Subject to any disclaimer, the term of this patent is extended or adjusted under 35 U.S.C. 154(b) by 559 days.

(21) Appl. No.: 11/690,814

(22) Filed: Mar. 24, 2007

(65) Prior Publication Data
US 2008/0232925 A1 Sep. 25, 2008

(51) Int. Cl.
*F16B 25/04* (2006.01)

(52) U.S. Cl. .................. 411/386; 411/387.4; 411/411; 411/416

(58) Field of Classification Search ............... 411/386, 411/387.1, 387.4, 307, 311, 411, 417
See application file for complete search history.

(56) References Cited

U.S. PATENT DOCUMENTS

| | | | | |
|---|---|---|---|---|
| 113,006 | A * | 3/1871 | Bidewll | 411/386 |
| 3,083,609 | A * | 4/1963 | Lovisek | 411/386 |
| 3,454,070 | A * | 7/1969 | Phipard, Jr. | 411/168 |
| 3,481,380 | A * | 12/1969 | Breed | 411/309 |
| 6,152,666 | A * | 11/2000 | Walther et al. | 411/311 |
| 6,926,484 | B2 * | 8/2005 | Kram et al. | 411/311 |
| 7,163,366 | B2 * | 1/2007 | Chen | 411/417 |
| 7,326,014 | B2 * | 2/2008 | Levey et al. | 411/308 |

* cited by examiner

*Primary Examiner*—Flemming Saether
(74) *Attorney, Agent, or Firm*—Banger Shia

(57) ABSTRACT

A screw with wave thread including a head, a shank extending therefrom, and a thread spirally disposed on the shank; in particular, the thread has respective first and second threaded sections. Each thread unit of the second threaded section defines a continuous wave-shaped directrix around the shank for a base. A plurality of thread segments are formed on each thread unit of the second threaded section, and each of which has an upper flank as well as a lower flank extended from the shank and disposed along the wave shape directrix to form into a wavy arrangement around shank, thereby disposing more peaks converged by the upper flank and the lower flank for increasing the drilling capability.

10 Claims, 6 Drawing Sheets

SCREW WITH WAVED THREAD

BACKGROUND OF THE INVENTION

1. Field of the Invention

The present invention relates to a screw design, particularly to a screw with waved thread.

2. Description of the Related Art

Referring to FIGS. 1 and 2, a conventional screw 1 comprises a head 11, a shank 12 connecting to the head 11, and a plurality of threads 13 spirally disposed on the shank 12; wherein, each thread 13 has an upper flank 131 and a lower flank 132 both extending from the shank 12, and an arris 133 disposed between the upper flank 131 and the lower flank 132. Moreover, the threads 13 have a plurality of notches 134 disposed thereon, and a thread portion 135 is formed between any two notches 134. Furthermore, the thread portions 135 are interlaced and are disposed in sawtooth shape, and the peaks 136 of the thread portions 135 are interlaced and are therefore located above or under the waved arris 133.

Due to the thread portions 135 interlaced and disposed in a sawtoothed shape, the area of the conventional screw 1 enabling the object to be cut increases. With the assistance of the aforesaid point, while in operation, the object will be rapidly cut and the screwing speed will enhance. Moreover, when the thread portions 135 in a sawtoothed shape blocks, the conventional screw 1 can be prevented from loosening or dropping out after it is screwed. However, while in operation, the conventional screw 1 still deserves to be improved, so the present invention is invented.

SUMMARY OF THE INVENTION

It is therefore the purpose of this invention to provide a screw with waved threads with the functions of enhancing the efficiency of screwing, reducing the torque of screwing, and preventing itself from loosening or dropping out.

The screw with waved threads in accordance with the present invention comprises a head, a shank connecting to the head, and a thread spirally disposed on the shank; wherein, the thread has a first threaded section disposed near the head and a second threaded section immediately following the first threaded section; each of the two threaded sections includes a plurality of interlaced thread segments on each thread unit thereof. Moreover, each of the thread segments has an upper flank and a lower flank both extending from the shank and a peak converged by the upper flank and the lower flank. Furthermore, a wave-shaped directrix spirally forms around the shank, and the peaks of the second threaded section are arranged with each other in accordance with the directrix, so that the upper flanks as well as the lower flanks on the thread unit of the second threaded section are arranged along the wave-shaped directrix. As a result of this specific design of a wave-like base lien of threads and a multiple-facet wave-like surface of the upper and lower flanks, there creates more thread segments and peaks for simultaneous multiple drilling. Accordingly, drilling power of the screw in the instant invention increases significantly and, in the meantime, the operational torque is reduced by the enhanced drilling power contributed by added peaks that are formed due to the converging of the upper and the lower flank, each of which including a multiple-facet waved-like surface that converge at the peaks.

In addition, as far as the locking ability of a screw is concerned, due to the wave-like surface as well as the interlace-spacing of threads, the screw in the instant invention is more capable of preventing the screw from loosening or dropping out than conventional arts.

The advantages of the present invention over the known prior art will become more apparent to those of ordinary skilled in the art upon reading the following descriptions in conjunction with the accompanying drawings.

DETAILED DESCRIPTION OF THE PREFERRED EMBODIMENTS

Figure 1:
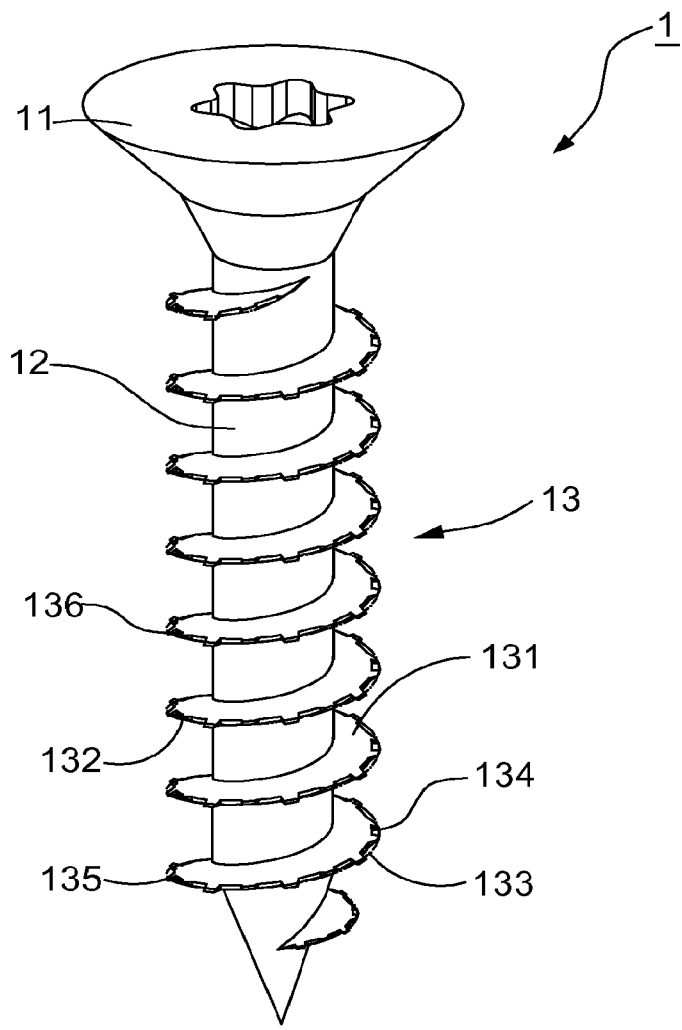
FIG. 1 is a perspective view showing a conventional screw.
Figure 2:
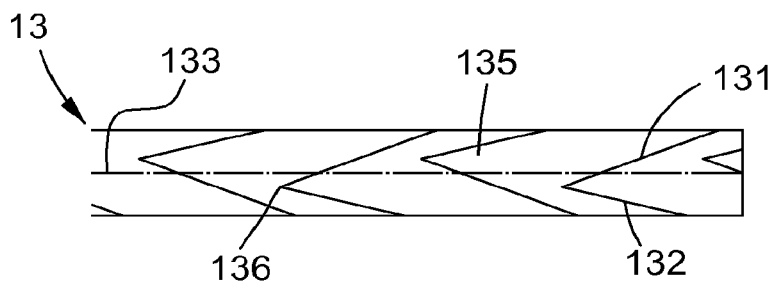
FIG. 2 is a partial schematic view showing a partial thread of said conventional screw.

Wherever possible, the same reference numbers are used in the drawings and the description to refer to the same or like parts.

Figure 3:
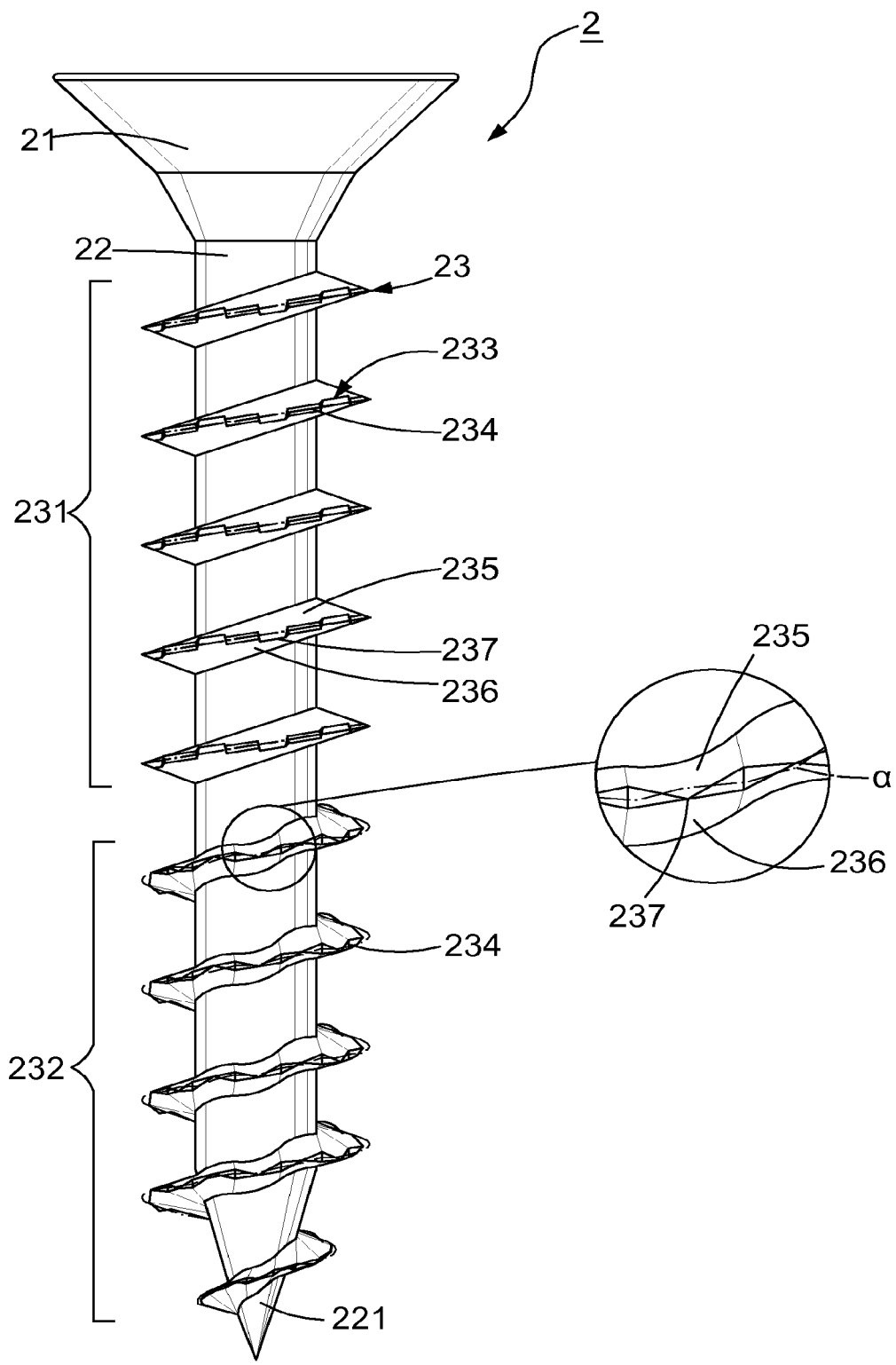
FIG. 3 is a perspective view showing the first preferred embodiment of the present invention.
Figure 4:
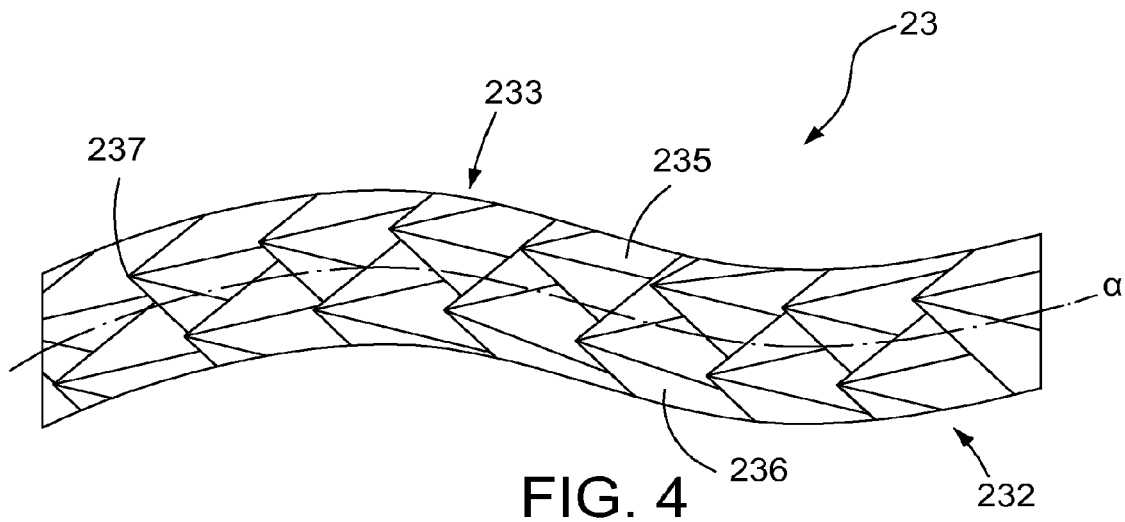
FIG. 4 is a partial schematic view showing the second threaded section of said first preferred embodiment.

Referring to FIGS. 3 and 4, the screw with waved thread 2 of the first preferred embodiment comprises a head 21, a shank 22 connecting to the head 21, and a thread 23 spirally disposed on the shank 22; wherein, a drilling member 221 is formed on the shank 22, opposite to the head 21. Wherein, the thread 23 has a first threaded section 231 disposed near the head 21, and a second threaded section 232 disposed immediately following the first threaded section 231, i.e. adjacent to the drilling member 221, and each of the two threaded sections 231,232 include thread units each provided with a plurality of interlaced thread segments 233 disposed thereon, which means a notch 234 is formed between any two adjacent threaded segments 233, and the depth of the notch 234 will be adjusted depending on the different kinds of objects that the screw 2 screws. Furthermore, each thread segment 233 has an upper flank 235 and a lower flank 236 both extending from the shank 22. A peak 23 is formed at the convergence of the upper flank 235 and the lower flank 236 and acts as a drilling point. A wave-shaped directrix a is spirally and continuously formed around the shank 22 as a base line for interlace-spaced threads, and the peaks 237 on each thread unit of the second threaded section 232 are disposed in a wave shape of the directrix a. Further, the upper flanks 235 as well as the lower flanks 236 of the thread segments 233 of the second threaded section 232 are disposed in a wave-form in accordance with directrix a. The space between any two adjacent peaks 237 of each two adjacent thread segments 233, i.e. the width of the notch 234, can be varied according to actual needs for different drilling purpose; in this preferred and simplified embodiment the notches 234 are shown to have a fixed width facilitate understanding of this invention.

Referring to FIG. 4, while in operation, the second threaded section 232 works by interlaced thread segments 233 that form a wave-shape to create more peaks 237 for drilling, which preferably increases the drilling power. The second threaded section 232 therefore can screw into an object in a rapid and labor-saving way, and the torque also decreases. Furthermore, the first threaded section 231 immediately follows the second threaded section 231 for incessantly screwing into the object. In this moment, the first threaded section 231 also makes use of the interlaced thread segments 233 with a better cutting effect keeping on threading into the object until the screw 2 is actually positioned within the object. Moreover, while the screw 2 is entirely screwed, the interlaced thread segments 233 of the first threaded section 231 and the second threaded section 232 also efficiently prevent the screw 2 from loosening and dropping out.

Figure 5:
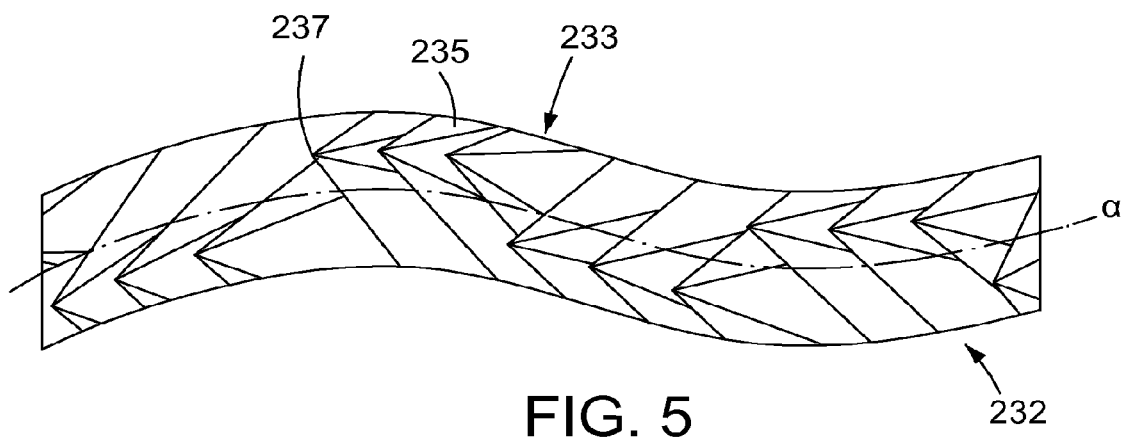
FIG. 5 is a partial schematic view showing the second threaded section of the second preferred embodiment.
Figure 6:
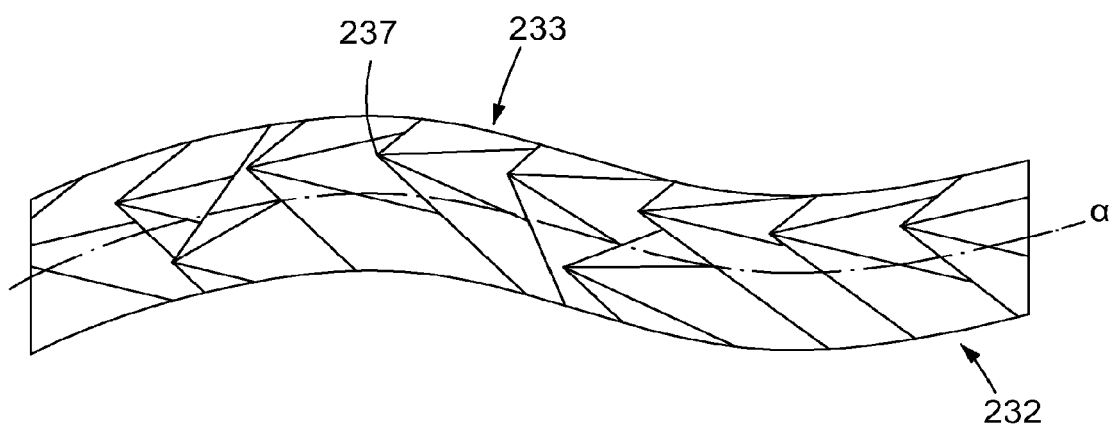
FIG. 6 is a partial schematic view showing the second threaded section of the third preferred embodiment.

Referring to FIG. 5, the drawing shows the second preferred embodiment of the present invention. The main differences between this preferred embodiment and the first preferred embodiment is that the thread segments 233 of the second threaded section 232 are interlaced in a non-symmetry way to be disposed at one side of the wave-shaped directrix a. As the drawing shows, three thread segments 233 are considered as a group to collectively dispose the peaks 237 at one side of the wave-shaped directrix a. It can also be the third embodiment as FIG. 6 shows, three thread segments 233 are considered as a group to be disposed at one side thereof, and a sole thread segment 233 disposed at the other side are alternate with the aforesaid group of thread segments 233. No matter in what way the thread segments 233 are disposed, they are all used to increase the drilling ability of the second threaded section 232.

Figure 7:
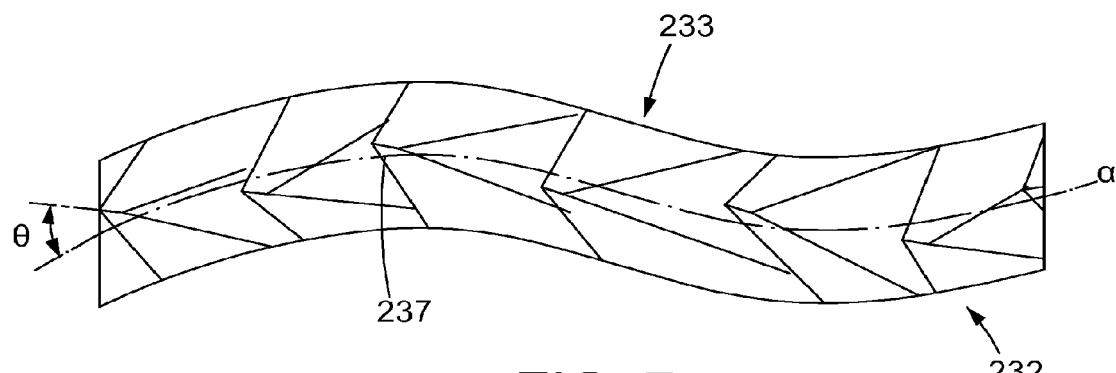
FIG. 7 is a partial schematic view showing the second threaded section of the fourth preferred embodiment.

Referring to FIG. 7, the drawing shows the fourth preferred embodiment of the present invention and most of its factors are the same as the screw 2 of the first preferred embodiment. To be more specific, each of peak 237 of thread segment 233 of the second threaded section 232 applies a drilling interface for cutting into an object, and the facet of the drilling interface is inclined with the wave-shaped directrix a by an included angle θ.

Figure 8:
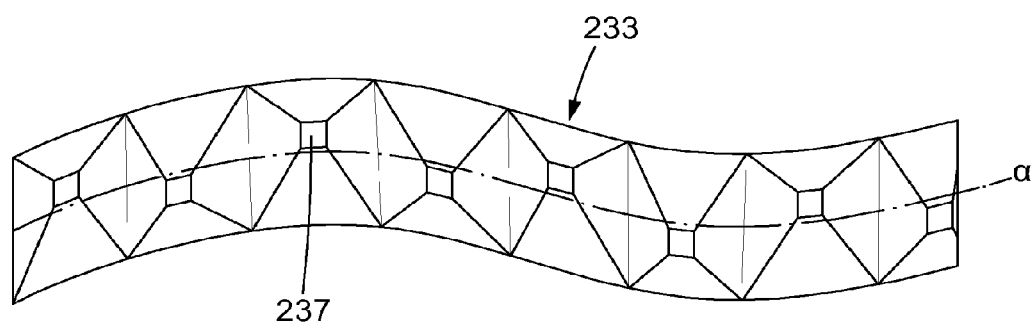
FIG. 8 is a partial schematic view showing the second threaded section of the fifth preferred embodiment.

Certainly, the peak 237 can also be a drilling facet as FIG. 8 shows. However, no matter what the peaks 237 of the thread segments 233 are designed, they both increase the cutting ability in screwing.

Figure 9:
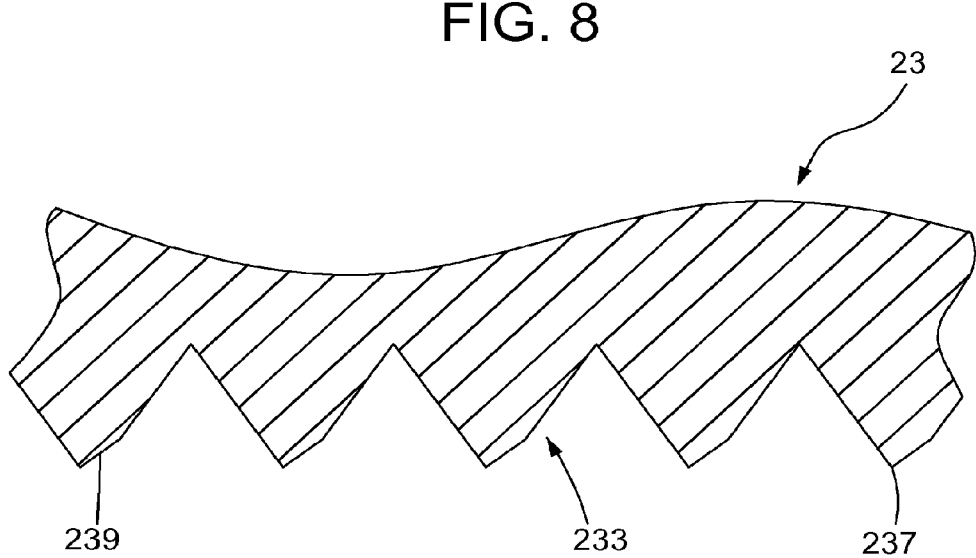
FIG. 9 is a partial schematic view showing the second threaded section of the sixth preferred embodiment.

Referring to FIG. 9, the drawing shows the sixth preferred embodiment of the present invention and most of its factors are the same as the screw 2 of the first preferred embodiment. To be more specific, a power receiving face 239 is formed on one side of the peak 237; moreover, the peak 237 in this embodiment is a drilling point in order to allow the thread segments 233 to be able to suffer more power in time of screwing.

Figure 10:
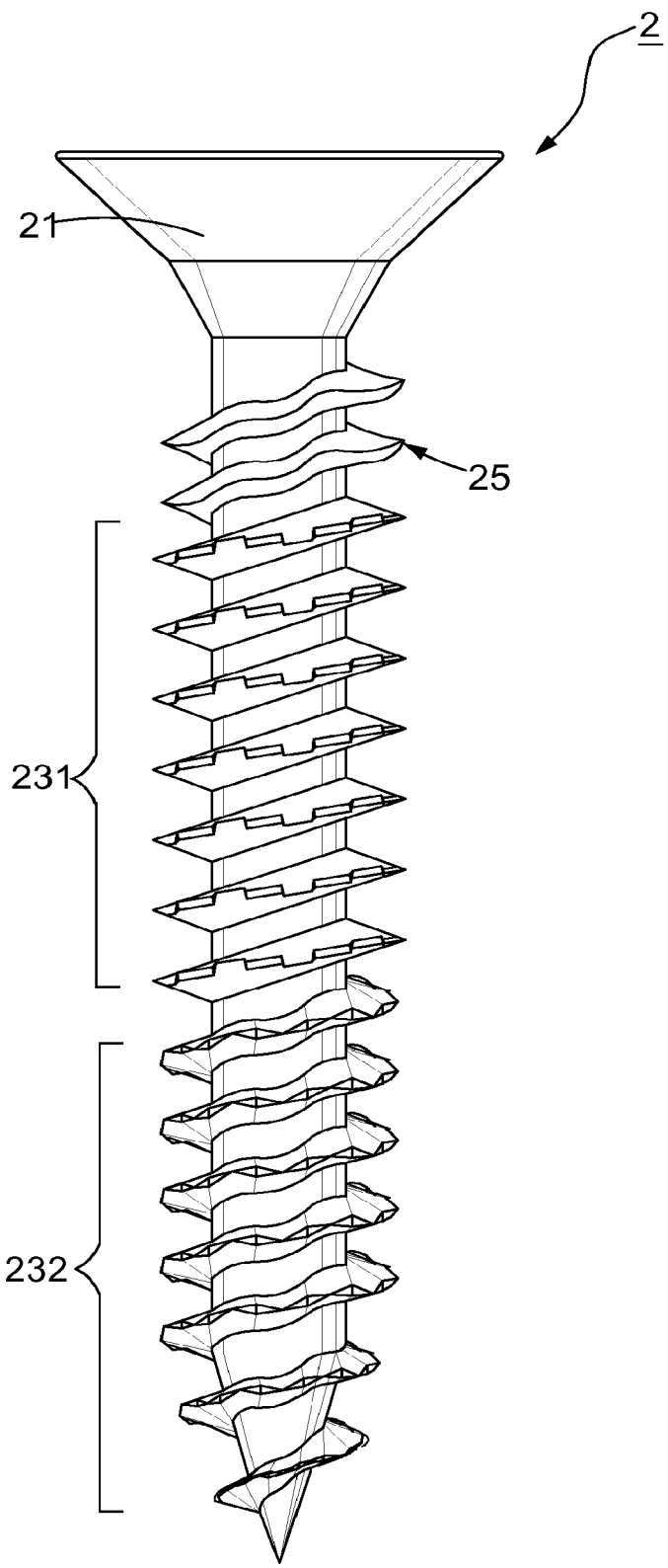
FIG. 10 is a perspective view showing the seventh preferred embodiment of the present invention.

Referring to FIG. 10, the drawing shows the seventh preferred embodiment of the present invention. In this embodiment, a plurality of third wave-shaped thread units 25 are disposed between the first threaded section 231 and the head 21. When the screw 2 is fastening to the object from the second threaded section 232 to the first threaded section 231 orderly, the threads 25 disposed in a wave-shaped contour hence can be well engaged with the object (not shown in the drawing). Therefore, the present invention will not loosen or drop out after it is well screwed.

Figure 11:
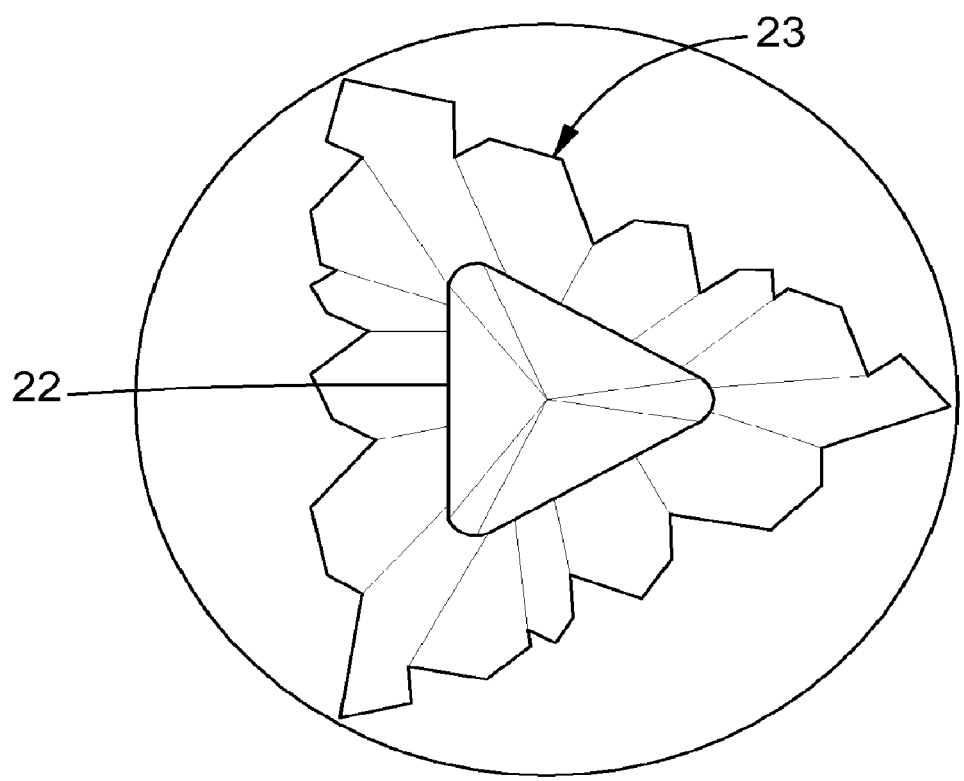
FIG. 11 is a schematic view showing the eighth preferred embodiment of the present invention from its bottom side.

Referring to FIG. 11, the drawing shows the eighth preferred embodiment of the present invention and most of its factors are the same as the screw 2 of the first preferred embodiment. To be more specific, the shank 22, and the thread 23 form a polygon, and they are shown as a triangular shape in this drawing. Therefore, while in operation, besides the functions of increasing the cutting efficiency, reducing the torque and preventing from loosening or dropping out, further accompanying the shank 22 and the thread 23 relying on the point of the triangle to cut the object (not shown in the drawing), the friction appearing from screwing will hugely reduce and achieve the effect of rapid screwing.

To sum up, the present invention is in particular to a plurality of the thread segments formed in the second threaded section that are spirally disposed along a wave-shaped directrix surrounding on the shank for serving as a base; wherein, each of the upper and lower flank on the thread segment extended from the shank disposes in a wavy arrangement along the wave-shaped directrix. Therefore, the peaks on the segments for cutting increase, and the screw has the advantage of enhancing the cutting efficiency and speed, while in the meantime, and of reducing the screwing torque. Still further, with the thread segments interlaced and formed in a waved shape for easy of engaging object materials, the present invention will not loosen or drop out after it is well screwed.

While we have shown and described the embodiment in accordance with the present invention, it should be clear to those skilled in the art that further embodiments may be made without departing from the scope of the present invention.

I claim:

1. A screw with waved thread comprising:
a head;
a shank connecting to said head with a drilling member formed opposite to the said head; and
a thread spiraling on said shank and having a first threaded section disposed near said head and a second threaded section disposed immediately following said first threaded section; wherein, each of said first and said second threaded sections including thread units, on each of which plurality of interlaced thread segments are disposed; each said thread segment having an upper flank and a lower flank both extending from said shank and a peak converged by said upper flank and said lower flank; a continuous wave-shaped directrix being defined around said shank as a base line for said second threaded section standing thereupon, and said peaks on said thread unit of said second threaded section being disposed in a wave shape of said directrix; said upper flanks and said lower flanks on said thread unit of said second threaded section being disposed in a wavy arrangement along said wave-shaped directrix.

2. The screw as claimed in claim 1, wherein, the space between any two adjacent peaks on each said thread unit of said second threaded section is not a constant.

3. The screw as claimed in claim 1, wherein, said directrix includes two sides, an upper side and a lower side, and at least two said adjacent peaks in a group are disposed on either side thereof.

4. The screw as claimed in claim 1, wherein, each of said peaks serves as a drilling interface.

5. The screw as claimed in claim 4, wherein, said drilling interface is inclined with said wave-shaped directrix by an included angle.

6. The screw as claimed in claim 1, wherein, each of said peaks adopts a drilling facet for cutting object.

7. The screw as claimed in claim 1, wherein, a power receiving face is formed on a side of said peak.

8. The screw as claimed in claim 1, wherein, a plurality of wave-shaped thread units are disposed between said first threaded section and said head.

9. The screw as claimed in claim 1, wherein, said shank forms a polygonal shape.

10. The screw as claimed in claim 1, wherein, any of said threaded sections forms a polygonal shape.

* * * * *